(12) United States Patent
Bohlig et al.

(10) Patent No.: US 8,560,459 B2
(45) Date of Patent: Oct. 15, 2013

(54) METHODS AND FACILITIES FOR A MUNICIPAL SOLID WASTE MANAGEMENT SYSTEM

(75) Inventors: James W. Bohlig, Cuttingsville, VT (US); Paula Calabrese, Mendon, VT (US)

(73) Assignee: Casella Waste Systems, Inc., Rutland, VT (US)

( * ) Notice: Subject to any disclaimer, the term of this patent is extended or adjusted under 35 U.S.C. 154(b) by 1504 days.

(21) Appl. No.: 11/282,075

(22) Filed: Nov. 17, 2005

(65) Prior Publication Data

US 2007/0112577 A1    May 17, 2007

(51) Int. Cl.
*G06Q 10/00*    (2012.01)
(52) U.S. Cl.
USPC ........................ 705/308; 405/129.95
(58) Field of Classification Search
USPC ............... 705/1, 1.1, 308; 405/129.95
See application file for complete search history.

(56) References Cited

U.S. PATENT DOCUMENTS

| | | | |
|---|---|---|---|
| 4,245,731 A | 1/1981 | Herbst et al. | |
| 4,425,070 A | 1/1984 | Howells et al. | |
| 4,573,641 A | 3/1986 | DeWoolfson et al. | |
| 4,597,487 A | 7/1986 | Crosby et al. | |
| 4,642,470 A | 2/1987 | Planke et al. | |
| 4,995,765 A | 2/1991 | Tokuhiro et al. | |
| 5,004,392 A | 4/1991 | Naab et al. | |
| 5,014,206 A | 5/1991 | Scribner et al. | |
| 5,028,196 A | 7/1991 | Richards et al. | |
| 5,035,564 A | 7/1991 | Matsumoto | |
| 5,042,635 A | 8/1991 | Bell | |
| 5,072,833 A | 12/1991 | Hansen et al. | |
| 5,100,005 A | 3/1992 | Noble et al. | |
| 5,101,997 A | 4/1992 | Bagwell et al. | |
| 5,105,972 A | 4/1992 | Waterston et al. | |
| 5,106,026 A | 4/1992 | Baron | |

(Continued)

FOREIGN PATENT DOCUMENTS

| | | |
|---|---|---|
| CA | 2115942 | 8/1994 |
| CA | 2345763 | 4/2000 |

(Continued)

OTHER PUBLICATIONS

Guy Crittenden, "Landfill Gas Utilization: BFI Canada's Energy-From-Waste Plant at Lachenaie, Quebec", Solid Waste and Recycling, Feb./Mar. 2004, vol. 9, Iss. 1, p. 23.*

(Continued)

*Primary Examiner* — Heidi Kelley
(74) *Attorney, Agent, or Firm* — Wilmer Cutler Pickering Hale and Dorr LLP

(57) ABSTRACT

The present invention includes a system and method for creating a municipal solid waste (MSW) system to address the multiple types of waste that are disposed by the public, and further, to provide a waste management solution that provides for the sustained economic development and growth of communities. The present invention also provides effective screening and separation of hazardous components in the waste stream, and further provides recovery and reuse solutions as alternatives to disposal of hazardous waste. The present invention further provides communities with a system and method to more effectively capture and use disposed MSW and other waste streams to provide renewable energy sources. Moreover, the present invention includes a method for establishing a municipal solid waste management system that makes sustainable development possible while preserving the economic interests of the parties involved.

17 Claims, 9 Drawing Sheets

(56) References Cited

U.S. PATENT DOCUMENTS

| | | |
|---|---|---|
| 5,111,927 A | 5/1992 | Schulze, Jr. |
| 5,131,552 A | 7/1992 | Falso |
| 5,172,824 A | 12/1992 | Stutler |
| 5,183,278 A | 2/1993 | Wade, Jr. |
| 5,192,092 A | 3/1993 | DiBenedetto |
| 5,192,121 A | 3/1993 | Stutler |
| 5,201,921 A | 4/1993 | Luttermann et al. |
| 5,209,312 A | 5/1993 | Jensen et al. |
| 5,215,264 A | 6/1993 | Lundquist |
| 5,222,853 A | 6/1993 | Carson |
| 5,226,519 A | 7/1993 | DeWoolfson |
| 5,230,393 A | 7/1993 | Mezey |
| 5,244,220 A | 9/1993 | Cortez |
| 5,249,689 A | 10/1993 | Wergeland et al. |
| 5,251,761 A | 10/1993 | Hansen et al. |
| 5,257,577 A | 11/1993 | Clark |
| 5,275,522 A | 1/1994 | Garrett, Jr. et al. |
| 5,288,196 A | 2/1994 | Horning et al. |
| 5,314,266 A | 5/1994 | Smith et al. |
| 5,316,152 A | 5/1994 | Ross |
| 5,339,980 A | 8/1994 | Stutler |
| 5,347,274 A | 9/1994 | Hassett |
| 5,350,120 A | 9/1994 | Melchionna |
| 5,355,987 A | 10/1994 | DeWoolfson et al. |
| 5,361,913 A | 11/1994 | Melchionna |
| 5,372,317 A | 12/1994 | Willis |
| 5,390,813 A | 2/1995 | Anderson et al. |
| 5,416,279 A | 5/1995 | Tseng |
| 5,423,494 A | 6/1995 | Kondo et al. |
| 5,441,160 A | 8/1995 | DeWoolfson et al. |
| 5,447,017 A | 9/1995 | Becher et al. |
| 5,458,350 A | 10/1995 | Johnson et al. |
| 5,461,972 A | 10/1995 | Tahkanen et al. |
| 5,465,822 A | 11/1995 | DeWoolfson et al. |
| 5,477,953 A | 12/1995 | Powell et al. |
| 5,484,246 A | 1/1996 | Horning et al. |
| 5,510,619 A | 4/1996 | Zachmann et al. |
| 5,511,687 A | 4/1996 | Garrett, Jr. et al. |
| 5,565,846 A | 10/1996 | Geiszler et al. |
| 5,566,066 A | 10/1996 | Weitzman et al. |
| 5,580,015 A | 12/1996 | Baker |
| 5,624,018 A | 4/1997 | Schuff et al. |
| 5,649,627 A | 7/1997 | Wako et al. |
| 5,662,235 A | 9/1997 | Nieto |
| 5,678,696 A | 10/1997 | Goetz |
| 5,699,525 A | 12/1997 | Embutsu et al. |
| 5,716,103 A | 2/1998 | Kann et al. |
| 5,765,986 A | 6/1998 | Hulls |
| 5,837,945 A | 11/1998 | Cornwell et al. |
| 5,842,652 A | 12/1998 | Warsing et al. |
| 5,857,822 A | 1/1999 | Christenson |
| 5,871,114 A | 2/1999 | Anderson et al. |
| 5,887,696 A | 3/1999 | Goetz |
| 5,915,244 A | 6/1999 | Jack et al. |
| 5,923,016 A | 7/1999 | Fredregill et al. |
| 5,927,518 A | 7/1999 | Sidwell |
| 5,947,256 A | 9/1999 | Patterson |
| 5,952,660 A | 9/1999 | Kip et al. |
| 5,960,402 A | 9/1999 | Embutsu et al. |
| 5,965,858 A | 10/1999 | Suzuki et al. |
| 5,983,198 A | 11/1999 | Mowery et al. |
| 6,007,005 A | 12/1999 | Gonzales et al. |
| 6,019,242 A | 2/2000 | Wysocki et al. |
| 6,024,513 A * | 2/2000 | Hudgins et al. .......... 405/129.95 |
| 6,055,573 A | 4/2000 | Gardenswartz et al. |
| 6,099,656 A | 8/2000 | Kustermann et al. |
| 6,111,524 A | 8/2000 | Lesesky et al. |
| 6,119,869 A | 9/2000 | Geiman |
| 6,131,371 A | 10/2000 | Esser et al. |
| 6,131,744 A | 10/2000 | Pratt |
| 6,137,900 A | 10/2000 | Steidel et al. |
| 6,141,945 A | 11/2000 | Becher |
| 6,191,691 B1 | 2/2001 | Serrault et al. |
| 6,209,978 B1 | 4/2001 | Khan |
| 6,216,878 B1 | 4/2001 | Wheat |
| 6,230,521 B1 | 5/2001 | Lehman |
| 6,234,317 B1 | 5/2001 | Sommer et al. |
| 6,236,831 B1 | 5/2001 | Mei et al. |
| 6,302,461 B1 | 10/2001 | Debras et al. |
| 6,313,423 B1 | 11/2001 | Sommer et al. |
| 6,354,441 B1 | 3/2002 | Geiman |
| 6,448,898 B1 | 9/2002 | Kasik |
| 6,505,106 B1 | 1/2003 | Lawrence et al. |
| 6,530,495 B1 | 3/2003 | Joseph |
| 6,536,622 B1 | 3/2003 | Planet et al. |
| 6,555,822 B1 | 4/2003 | Zoidis et al. |
| 6,592,625 B2 | 7/2003 | Cauthen |
| 6,595,723 B2 | 7/2003 | Ianniello et al. |
| 6,718,343 B2 | 4/2004 | Kamata et al. |
| 6,796,225 B1 | 9/2004 | Henrysson et al. |
| 6,840,445 B2 | 1/2005 | Gatz |
| 6,846,131 B2 | 1/2005 | Ianniello et al. |
| 6,886,000 B1 | 4/2005 | Aggarwal et al. |
| 6,907,432 B1 | 6/2005 | Szmanda et al. |
| 6,952,625 B2 | 10/2005 | Uetake et al. |
| 6,977,612 B1 | 12/2005 | Bennett |
| 6,985,879 B2 | 1/2006 | Walker et al. |
| 6,993,712 B2 | 1/2006 | Ramachandran et al. |
| 7,032,820 B2 | 4/2006 | Kreiner et al. |
| 7,051,925 B2 | 5/2006 | Schwarz, Jr. |
| 7,133,895 B1 | 11/2006 | Lee et al. |
| 7,134,084 B1 | 11/2006 | Rashid et al. |
| 7,136,865 B1 | 11/2006 | Ra et al. |
| 7,167,836 B2 | 1/2007 | Gottselig et al. |
| 7,313,602 B2 | 12/2007 | Ono et al. |
| 7,424,617 B2 | 9/2008 | Boyd et al. |
| 2001/0049583 A1 | 12/2001 | Burnstein et al. |
| 2002/0008104 A1 | 1/2002 | Pickler |
| 2002/0026326 A1 | 2/2002 | Stevens |
| 2002/0050945 A1 | 5/2002 | Tsukishima et al. |
| 2002/0059075 A1 | 5/2002 | Schick et al. |
| 2002/0072923 A1 | 6/2002 | Guidry |
| 2002/0147502 A1 | 10/2002 | Price et al. |
| 2002/0170685 A1 | 11/2002 | Weik et al. |
| 2002/0194144 A1 | 12/2002 | Berry |
| 2003/0012380 A1 | 1/2003 | Guggenheim |
| 2003/0069745 A1 | 4/2003 | Zenko |
| 2003/0097310 A1 | 5/2003 | Ono et al. |
| 2003/0115097 A1 | 6/2003 | Sokei et al. |
| 2003/0139981 A1 | 7/2003 | Mizuno et al. |
| 2003/0140828 A1 | 7/2003 | Liu |
| 2003/0233041 A1 | 12/2003 | Yaksh et al. |
| 2004/0046672 A1 | 3/2004 | Kasik et al. |
| 2004/0167799 A1 | 8/2004 | Berry |
| 2004/0199401 A1 | 10/2004 | Wagner et al. |
| 2004/0203360 A1 | 10/2004 | Yamagiwa |
| 2004/0226755 A1 | 11/2004 | Pottebaum et al. |
| 2004/0243468 A1 | 12/2004 | Cohagan et al. |
| 2005/0008339 A1 | 1/2005 | Kuroiwa et al. |
| 2005/0043963 A1 | 2/2005 | Soga et al. |
| 2005/0080520 A1 | 4/2005 | Kline et al. |
| 2005/0166380 A1 | 8/2005 | Ishida et al. |
| 2005/0250440 A1 | 11/2005 | Zhou et al. |
| 2005/0273340 A1 | 12/2005 | Yamamoto |
| 2005/0281653 A1 | 12/2005 | Channel |
| 2006/0178933 A1 | 8/2006 | FitzGerald et al. |
| 2007/0100694 A1 | 5/2007 | Kopps |
| 2007/0102506 A1 | 5/2007 | Stevens |
| 2007/0219862 A1 | 9/2007 | Casella et al. |
| 2007/0260466 A1 | 11/2007 | Casella et al. |
| 2008/0029634 A1 | 2/2008 | Kim et al. |
| 2008/0059970 A1 | 3/2008 | Gonen |
| 2008/0061124 A1 | 3/2008 | Langlois et al. |
| 2008/0061125 A1 | 3/2008 | Langlois et al. |
| 2008/0069641 A1 | 3/2008 | Kreiner et al. |
| 2008/0086411 A1 | 4/2008 | Olson et al. |
| 2008/0169342 A1 | 7/2008 | Gonen |
| 2008/0172298 A1 | 7/2008 | Gonen |
| 2008/0296374 A1 | 12/2008 | Gonen et al. |
| 2009/0138358 A1 | 5/2009 | Gonen et al. |

(56) References Cited

U.S. PATENT DOCUMENTS

FOREIGN PATENT DOCUMENTS

| GB | 2395887 | 6/2004 |
| JP | 2001195496 | 7/2001 |
| JP | 2002297840 | 10/2002 |

OTHER PUBLICATIONS

Corinne Lynds, "Getting the Most Out of Municipal Waste: CCI's BTA Process Creates Compost and Energy", Plant T, Nov. 26, 2001, vol. 60, Iss. 17, p. 17.*

Biddle, D. "Entrepreneurs Launch Business That Pays Residents to Recycle." In Business, Emmaus, vol. 27, Iss. 5, Sep./Oct. 2005 (5 pages).

Morris, J. "What works best to increase waste diversion?" Resource recycling. (Retrieved Oct. 23, 2007). Available online http://www.p2pays.org/ref/12/11770.pdf. Jan. 2000. (4 pages).

PCT/US2007/005445 International Search Report mailed Oct. 3, 2007 (2 pages).

PCT/US2007/005271 International Search Report mailed Oct. 10, 2007 (2 pages).

Stewardship Ontario, "Development and review of baseline Information on multi-residential recycling programs in Ontario." (Retrieved Oct. 23, 2007). Available online at http://www.stewardshipontario.ca/pdf/ocfund/reports/18/18_report.pdf. Feb. 2006 (38 pages).

The East-West Gateway, "Environmental benefits of recycling study for the St. Louis-Jefferson solid waste management district, City of St. Louis, Jefferson County, St. Louis County, and St. Charles County." (Retrieved Oct. 23, 2007). Available online at http://www.swmd.net/documents/EBRReport-Feb05.pdf. Feb. 2005 (46 pages).

* cited by examiner

METHODS AND FACILITIES FOR A MUNICIPAL SOLID WASTE MANAGEMENT SYSTEM

BACKGROUND OF THE INVENTION

1. Field of the Invention

The present invention relates generally to the field of solid waste management, and more specifically to systems and methods for improving municipal solid waste (MSW) management to maximize use of renewable resources and benefit a community.

2. History of the Related Art

As waste generation continues to grow faster than population, leaders in MSW services must respond to significant challenges. Disposal of a wide variety of materials poses challenges in handling and disposing of waste in varied shapes, sizes, states, and reusable content. Increases in disposal rates, and reduced public acceptance of constructing and operating traditionally-designed MSW facilities create a deficit of MSW landfill space that must constantly be addressed by solid waste management personnel and companies. Unfortunately, the reality of present-day waste management systems is that landfills are viewed as liabilities, both in the economic sense and the community-development sense. The present invention shifts that paradigm from landfill-as-liability to landfill-as-asset which will only increase the environmental health of communities and permit sustainable growth and development.

In one kind of municipal waste management, a private waste management company carries out the oversight and operation of a landfill. The economics of the arrangement generally involve a landfill lease payment from the company to the community, and a waste removal and disposal payment made from the community to the company. As such, communities typically select the waste management company that offers the highest lease payments, and companies typically bid on contracts with sufficient waste volume to maintain their profitability. While this business model has proved reliable in the past, the current pace of waste production requires that both communities and companies take an innovative approach to waste management.

A great deal of the current research and innovation related to MSW management is focused on extending the life and performance of existing landfills. However these types of innovations are generally shortsighted as they merely show how to extend the life of landfills and rather than solve the underlying need to have sustained economic development in our communities. Accordingly, what is needed is a system and method for a MSW operation to address the multiple types of waste that are disposed by the public, and further, to provide a waste management solution that more effectively addresses the issue of sustainable economic development. Additionally, there is a need in the art for a system and method that effectively reduce the total volume of waste through increasing the reuse of products as well as the use of beneficial by-products of the waste management process.

A further substantial challenge is the management of solid waste (municipal or not) that can contain hazardous components that threaten public health, safety and the environment. Hazardous waste poses additional public fears and handling/disposal issues for waste management personnel. Therefore, what is needed is a system that provides effective screening and separation of hazardous components in the waste stream, and further provides recovery and reuse solutions as alternatives to disposal of hazardous waste.

An accompanying issue with waste management in general, and specifically in MSW management, is the loss of resources that occurs. The energy required to create products, sustain them throughout use, and ultimately dispose of them are generally lost in the current waste management system. A certain percent can currently be captured through recycling efforts, but on the whole, most "used" products are disposed into a MSW landfill with few options for recovery and use of the energy and/or benefit contained in the disposed MSW. What is needed therefore is a system and method to more effectively capture and use disposed MSW and other waste streams to provide renewable energy sources.

The concept of "sustainable development" and a "sustainable community" has been in existence for years. According to Webster's New Millennium™ Dictionary of English, the term "sustainable development" means "any construction that can be maintained over time without damaging the environment; development balancing near-term interests with the protection of the interests of future generations". A sustainable community provides a better quality of life for current and future residents by optimizing nature's ability to effectively and efficiently function over time. An ideal sustainable community has systems in place to minimize waste, prevent pollution and promote efficiency, and further develops resources to revitalize local economies.

The waste management system is a central component of the infrastructure of a sustainable community. This critical component must be managed by technologies, systems and methods that support and drive sustainable physical environments and communities. Caring for the air, land, water, other natural resources and the public's health is fundamental in attaining the long-term objectives of sustainability and solid waste management. However the reality of the "sustainable community" concept is that this is very difficult to achieve and to date has existed more in theory than in practice. The necessary technologies, systems and methods either do not exist or have not been operated in a synergistic manner to derive the desired economic and environmental benefits and outputs.

While the goals of sustainable development are universally lauded by both private and public entities, the simple economics of the waste management industry often belie any noble intentions. As previously noted, the public views waste management systems primarily as a liability rather than as an asset. This mindset is based largely upon the emissions that are generated by landfills, including leachate and methane gas, which produce a number of unfortunate side effects. The state of the art has not developed a zero-emissions landfill system that is capable of generating assets such as heat and combustible gas.

Accordingly, what is needed is an improvement in the art of landfill design and waste management that will accomplish the twin goals of a zero-emissions facility and the development of usable, renewable resources for the community. In short, what is needed is an approach to MSW management that better supports the concept of "sustainable community" and further can be implemented and operated successfully, as opposed to being a theoretical concept. In addition, what is needed is a system that organizes the necessary technologies, systems and methods and operates them in a synergistic manner to provide the desired economic and environmental benefits and outputs. In sum, there is a need in the art for a system and method for waste management that provides the environmental benefits of sustained development while simultaneously providing the economic basis for pubic and private cooperation.

Therefore it is an object of the present invention to provide a system and method for a MSW system that is both zero-emissions and asset producing and therefore more appealing and beneficial to communities. The present invention addresses the multiple types of waste that are disposed by the public, and further, provides a waste management solution that more effectively addresses the issue of waning landfill capacity, i.e. the present invention increases the size of each landfill through more effective systems configuration and management. It is a further object of the present invention to provide effective screening and separation of hazardous components in the waste stream, and further provides recovery and reuse solutions as alternatives to disposal of hazardous waste. It is yet a further object of the present invention to provide communities with a system and method to more effectively capture and use disposed MSW and other waste streams to provide renewable energy sources. Moreover, it is an object of the present invention to present these and other goals in a methodology that makes sustainable development possible by benefiting the economic and environmental interests of the parties involved.

SUMMARY OF THE PRESENT INVENTION

The present invention is a system for and method of designing and operating a synergistically connected, sustainable environmental and economic development program to manage solid waste. The present invention is specifically adapted to operate in a zero-emissions state while simultaneously providing numerous assets that will aid in community development and economic growth. Utilization of the system and method of the present invention yields larger landfill space through novel use of recycling, degradation, containment and energy extraction subsystems, described in detail below.

In part, the present invention includes a synergistic system comprised of various landfill elements such as a municipal recycling facility, an electronic recycling facility, an environmental education center, a landfill gas energy production plant, a waste to energy biomass production plant, a beneficiating facility for glass, plastics and pulp, and means for composting and renewable energy production. The landfill gas energy production plant stores and distributes gas removed from the landfill that can be used for energy. The system may utilize its own conversion means to harness the landfill gas energy for operating the various landfill elements, including the vacuum or other means that remove the gas in the first place. Moreover, the landfill gas can be distributed to the community for use by other industries that consume methane and other chemicals for energy use, including heating uses. Each of these elements is selected and synergistically utilized to meet the unique needs of each community.

In order to properly implement the sustained development system of the present invention, a method for establishing a community-company venture is also included herein. The method includes the steps of identifying the objectives of both the community and the company and computing an economic value for each of these objectives. The respective economic values are then reconciled in such a manner that a community-company venture can be established that provides ample economic incentives for each party while also improving the general health of the community environment. In particular, the community objectives include a plurality of elements adapted for sustainable development.

For example, the community may have certain waste management priorities such as renewable energy, recycling facilities, composting of organic and green waste, electronics recycling and environmental and agricultural education. According to the present invention, each of these facilities and programs is provided and operated by the company on behalf of the community. Each of these facilities and programs is assigned an economic value, which in turn is used to offset a portion of the lease payment paid by the company to the community. As such, the company remains in a profitable position with respect to its waste management business and the community is the beneficiary of an improved waste management system with numerous economic and environmental benefits to its population and stakeholders.

As shown below, the design and implementation of the present invention protects the environment and public health and conserves natural resources more effectively than present municipal waste management services. In particular, the system and method of the present invention creates a symbiotic relationship between the waste management company and the community whereby each party contributes to both the economic vitality and the overall health and welfare of the community. These and numerous other benefits and advantages of the present invention are described in detail below with reference to the following figures.

DETAILED DESCRIPTION OF THE PREFERRED EMBODIMENTS

As described in detail below, the present invention includes a method for establishing a municipal solid waste management system 10 preferably composed of a municipality or community and a waste management company. Typically, the burdens of removal, handling, disposal and maintenance of waste falls upon a local government, such as a city or municipality. In the United States, these communities commonly enter into contracts with private companies that construct and maintain landfills and transport the waste from the communities to the landfills for disposal and storage. The companies typically obtain the contracts through a bidding process whereby the highest bidder undertakes the disposal duties in exchange for fees that depend on the volume and frequency of waste disposal.

While this model has proven economically effective over the years, the current landscape of urban and suburban life has sufficiently modernized so as to require new methods and approaches for dealing with the environmental, historical and economical impacts of waste disposal. As such, the present invention provides a method for establishing a municipal solid waste management system 10 that recognizes the complexity of contemporary waste disposal. As with any commercial arrangement, a waste disposal system contains certain economic externalities, some of which are positive and some of which are negative. Rather than focus on the simple economics of a typical contract, i.e. monetary consideration, the present invention provides a mechanism by which to monetize and value both the positive and negative externalities so as to more clearly reflect the desires and values of the parties to the contract. For example, a community may have certain recycling or energy needs that can be met through the installation of selected landfill components. The present invention provides a method for reconciling the positive impacts of increased recycling and energy production with the potential increased capital costs associated with constructing the landfill. In sum, the present invention provides a methodology for creating a sustainable, economical and environmentally sound municipal waste disposal system 10.

Figure 1:
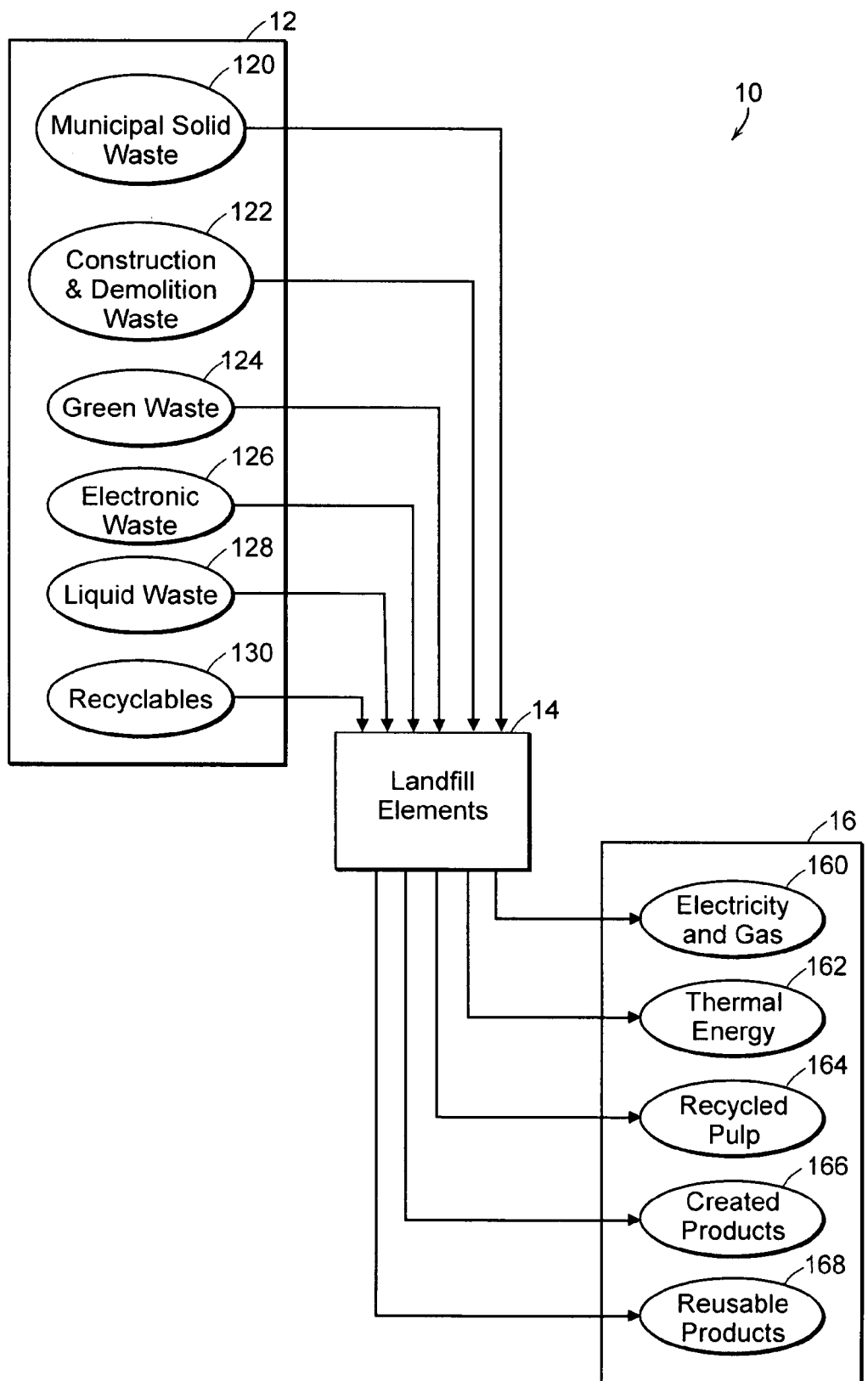
FIG. 1 is a flow chart depicting a method for establishing a municipal solid waste management system in accordance with the present invention.

FIG. 1 is a flow chart depicting a method for establishing a municipal solid waste management system 10 in accordance with the present invention. As shown, the system 10 includes three principle components. A plurality of source inputs 12 are deposited into a plurality of landfill elements 14, which in turn are specifically adapted to produce a plurality of value outputs 16, as described further herein.

The source inputs 12 shown in FIG. 1 include, for purposes of example, municipal solid waste 120, construction and demolition waste 122, green waste 124 including agricultural waste and food waste, electronic waste 126, liquid waste 128 and recyclables 130. Likewise, example value outputs 16 include electricity and gas 160, thermal energy 162, recycled pulp 164, created products 166 such as mulch, fill and other agricultural products, and reusable products 168. The value outputs 16 can be further characterized and valued according to the present invention in order to optimize the performance of the system 10.

For example, the electricity and gas 160 that is generated by the landfill elements 14 can be routed to a community power grid and partially utilized by the landfill elements 14 to sustain its own operation. Similarly, the thermal energy 162 generated by the landfill elements 14 can be used for hydroponics and aquaculture in order to grow, maintain and potentially harvest plant products. If the landfill elements 14 include means for generating electricity and gas 160 as well as thermal energy 162, then the system 10 itself can be designed to include components or attributes the consume electricity and gas 160 and thermal energy 162. Thus, thermal energy 162 generated by the landfill elements 14 can be used to heat a greenhouse located on the landfill grounds, which in turn will also reduce emissions produced by other source inputs 12 and landfill elements 14. In sum, by properly matching the source inputs 12 to the landfill elements 14 and the desired value outputs 16, the system 10 of the present invention can become an integral part of a community's overall environmental health.

Figure 2:
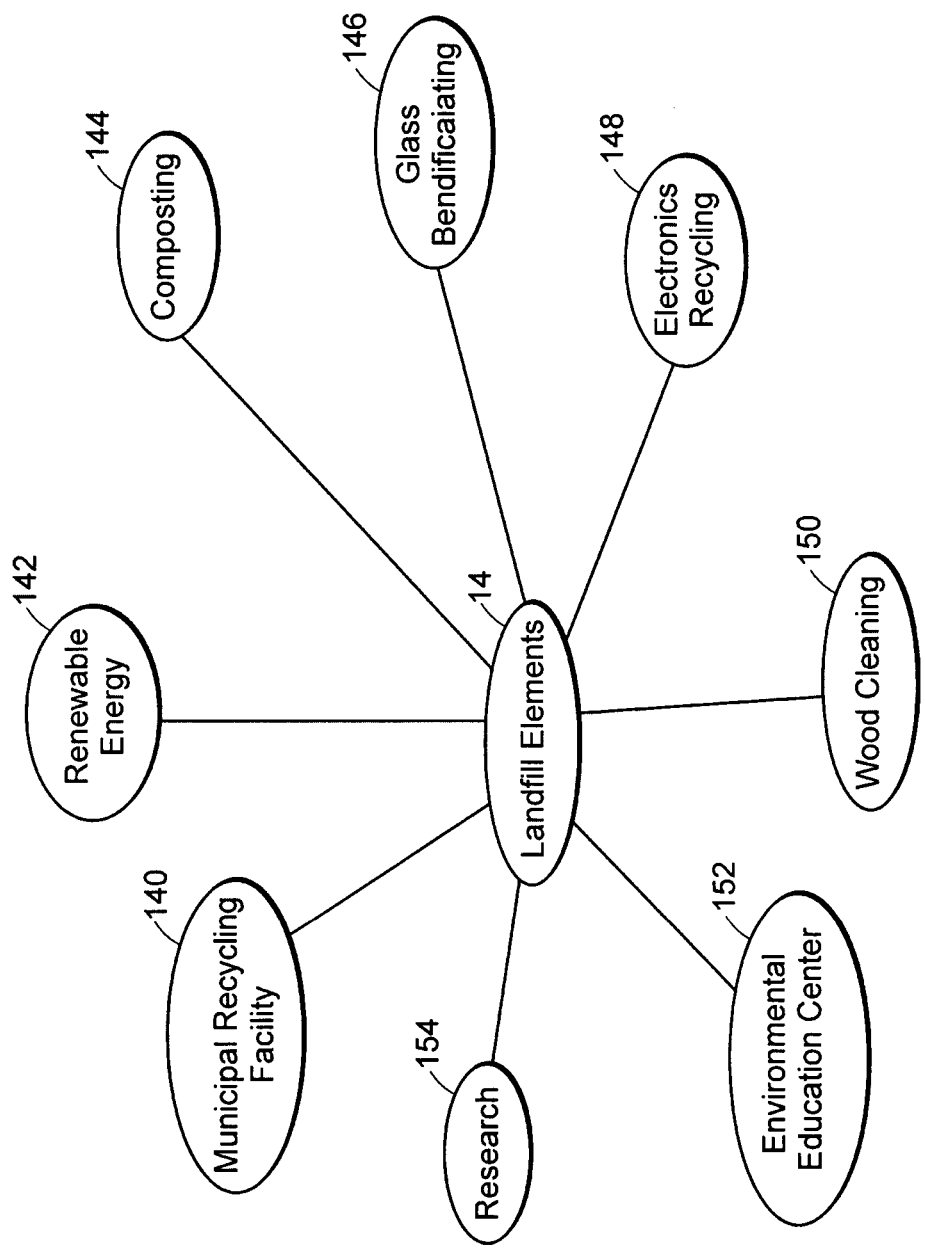
FIG. 2 is a state diagram illustrating a plurality of elements forming a waste management system in accordance with the present invention.

FIG. 2 is a state diagram illustrating a plurality of landfill elements 14 that partially form the waste management system 10 of the present invention. In addition to a landfill itself (not shown), typical landfill elements 14 of the system 10 include a municipal recycling facility 140 (MRF), a renewable energy element 142 and a composting element 144. Additionally, the system 10 would preferably include a beneficiating element 146 for glass, plastics and pulp, an electronic recycling element 148 and a wood cleaning element 150 for the cleaning and processing of wood products that may be used as pulp, mulch, fill or other agricultural outputs. Lastly, a preferred system 10 includes an environmental education center 152 and a research facility 154 for use by employees and customers related to the system 10 as well as interested members of the community, i.e. the stakeholders in the operation and products of the system 10.

Figure 3:
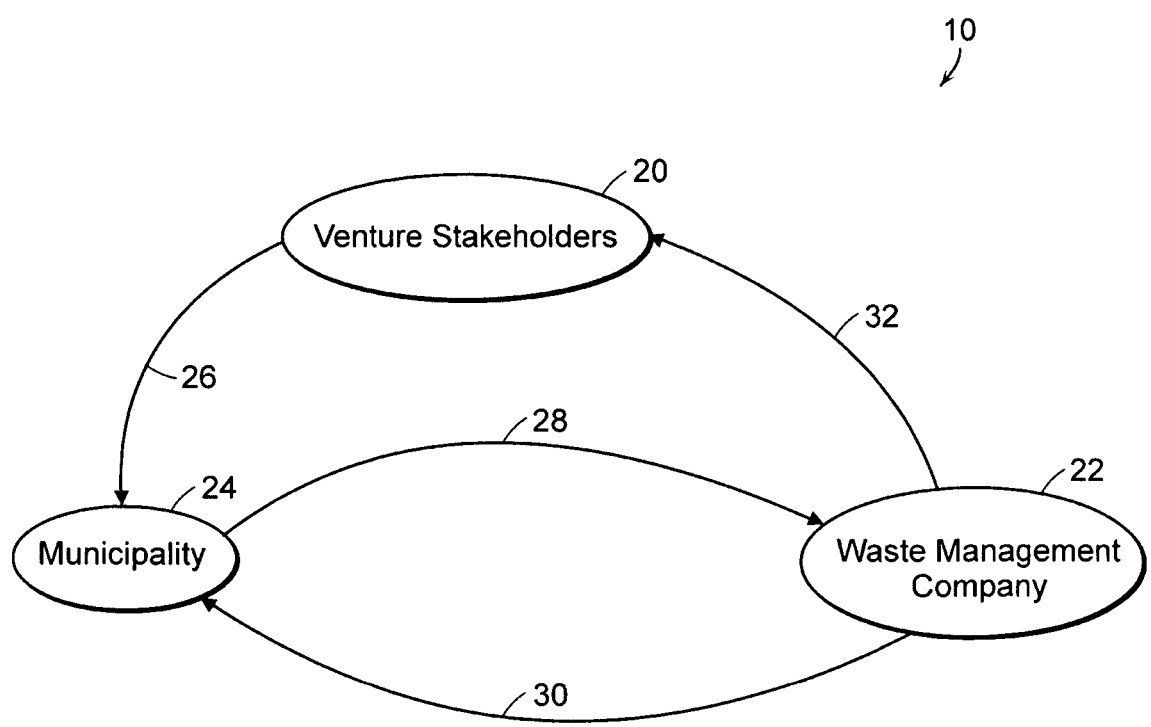
FIG. 3 is a state diagram illustrating the flow of benefits between parties according to the method of the present invention.

FIG. 3 is a state diagram illustrating the flow of economic and environmental benefits between parties according to the method of the present invention. The parties that share the risks and benefits of the method of the present invention are the venture stakeholders 20, the waste management company 22, and the community 24. The venture stakeholders 20 include primarily the citizens and taxpayers of the community 24, but also include the employees of both the waste management company 22 as well as other scientists, students, business leaders and conservationists that have a vested interest in the sustained economic development of the community 24.

In a typical cycle embodied by the present invention, the economic flow of risks and benefits begins with a payment of taxes or other public contributions by the value stakeholders 20 to the community 24, thereby generating a tax base 26. The community 24 typically will then solicit bids through which any waste manager may offer to pay a fee for the use of a publicly established landfill (not shown). According to the present invention, the waste management company 22 will proffer a bid 30 and as consideration the community 24 will use its tax base 26 to make a volume payment 28 back to the waste management company 22. In a typical contract, the volume payment 28 will set forth various schedules of payments that depend upon the type of waste managed, the volume of waste removed from the community, and the frequency of waste removal from the community 24.

As noted above, the foregoing analysis would completely describe the economics of waste management according to the state of the art. However, unlike the prior art, the present invention includes another economic transfer from the waste management company 22 to the venture stakeholders 20 that includes all of the tangible and intangible economic and environmental benefits associated with the establishment of the system 10, i.e. a plurality of positive externalities 32 that lead to environmental health and sustainable development. Accordingly, as the venture stakeholders 20 are receiving economic and environmental benefits directly from the waste management company 22, and the bid 30 can be customized to meet its unique economic and environmental needs while advancing the sustainability of the community.

The system 10 of the present invention is a novel means for shifting various service provisions and responsibilities from the community 24 to a private enterprise while growing its economic base and protecting the surrounding environment. Through the methodology of the present invention, the waste management company 22, in exchange for the customized bid 30 described above, takes responsibility for providing numerous other environmental and economic benefits to the community 24 at large, namely those services that the community 24 has selected according to its own objectives that will increase the sustainability of the community.

Figure 4:
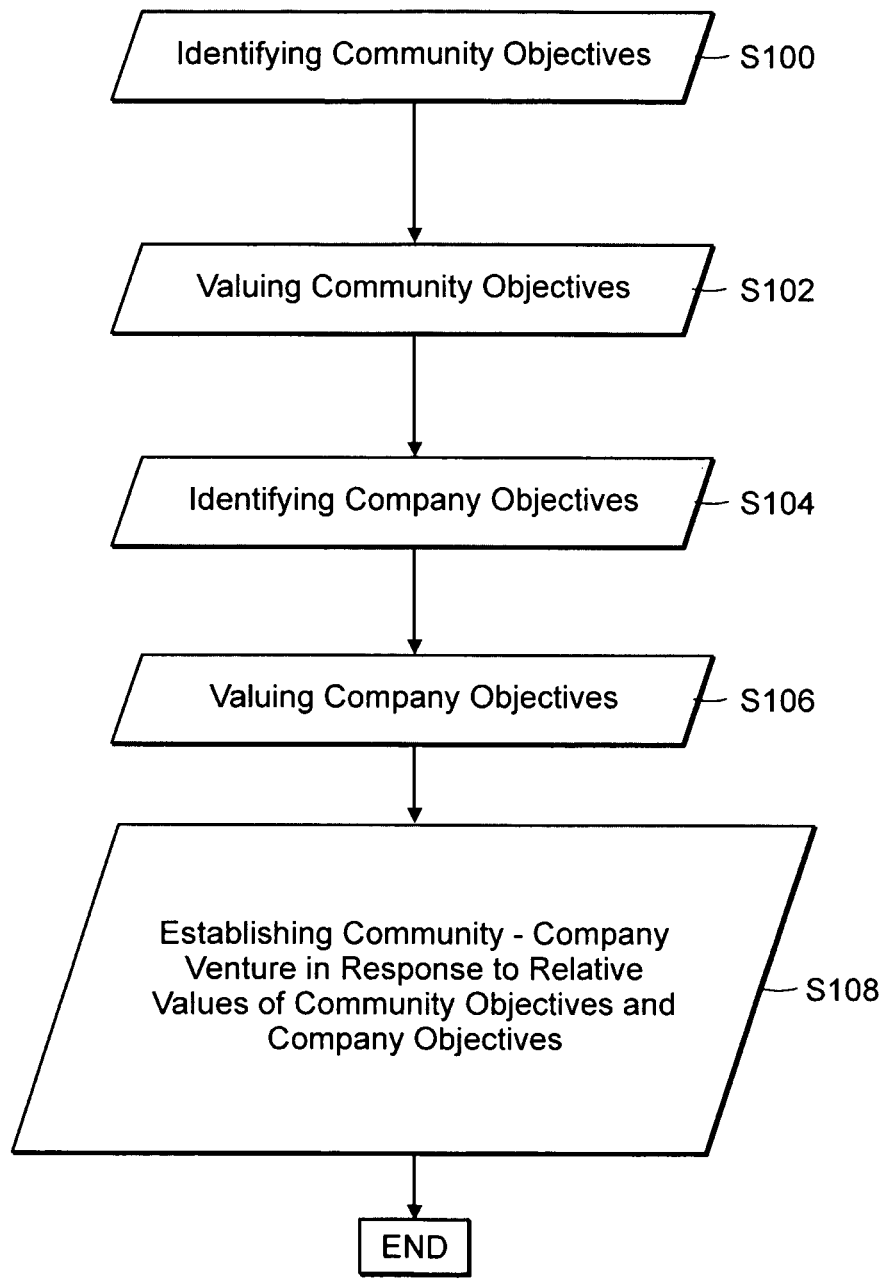
FIG. 4 is a flow chart illustrating the method of the present invention according to a preferred embodiment.

The system 10 of the present invention is established according to the method of the present invention, set forth generally in the flow chart of FIG. 4. In its preferred embodiments, the method of the present invention is practiced through computer software or other computational means. As the process of establishing a community-company venture is largely interactive and negotiated, the method of the present invention is preferably adapted for receiving input values and computing output values over a range of selected pre-conditions. The present invention is preferably adapted for optimizing the negotiation and contracting processes of entering into a waste management agreement.

The method of the present invention can be described by reference to an algorithm or series of steps. In step S102, the method recites the step of identifying the community objectives; or rather identifying those services and benefits the community would like to receive as value outputs 16 of the waste management system 10. As previously detailed, sample community objectives could include the production of electricity and gas 160, the production of thermal energy 162, recycled pulp 164 and the like.

Other community objectives may not be derived from the operation of the system 10, but rather may be negotiated during the formation of the system 10. For example, the community may have a need for increased education related to the environmental or agricultural sciences, a need for increased research and development related to land use and zoning or otherwise require an investment into the community infrastructure. These types of community objectives are not necessarily met by the recycling of glass or composting of green waste, but they nevertheless constitute a distinct and negotiable value that the community may regard as essential to its sustained development. According to the present invention therefore, the term community objectives does not merely relate to tangible commodities or byproducts of waste management, but in addition it includes the further investment required to maintain and grow an ecologically-conscious populace that recognizes the importance of sustainable development.

Step S102 recites valuing the community objectives, which as noted above, requires the monetization of both the tangible byproducts of sound landfill management as well as the capital and investment costs of meeting the rest of the community objectives. Thus the step of valuing the community objectives will preferably include the monetary values of the byproducts of the waste management system 10, i.e. the value of the gas, electricity, and thermal energy generated by the landfill elements 14 as well as the savings generated through improved recycling of glass and electronics. Step S102 further includes monetizing the value of the remaining community objectives, such as for example the value of educational scholarships, research fellowships, as well as both research and educational facilities. Accordingly, step S102 will constitute the full value of the positive externalities 32 described above with respect to FIG. 3. Additionally, step S102 will include the value of the bid or lease payments promised by the company as party to the waste management contract.

Step S104 requires identifying the company objectives and step S106 requires valuing the company objectives. The company objectives are typically entry into the waste management contract, and the value of the company objectives will be the projected value of the waste management contract to the company. As previously noted, the company is generally compensated under the contract for waste removal, transport, processing and storage on a volume basis. Thus the value of the company objectives can be computed as the projected revenues derived from these services over the life of the contract.

In step S108, the method recites the step of establishing a community-company venture in response to the relative values of the community objectives and the company objectives. As previously noted, the economics of the contract are determined by the value of the company bid, the value of the positive externalities offered to the community in accordance with the community objectives, and the value of the waste management services provided by the company. In contrast to the prior art, however, any contract or venture established according to the present invention will inevitably shift some of the initial cash burden on the company into other tangible and intangible benefits desired by the community, thus reducing the cash value of the waste management contract and promoting the overall health and economy of the community.

Figure 5:
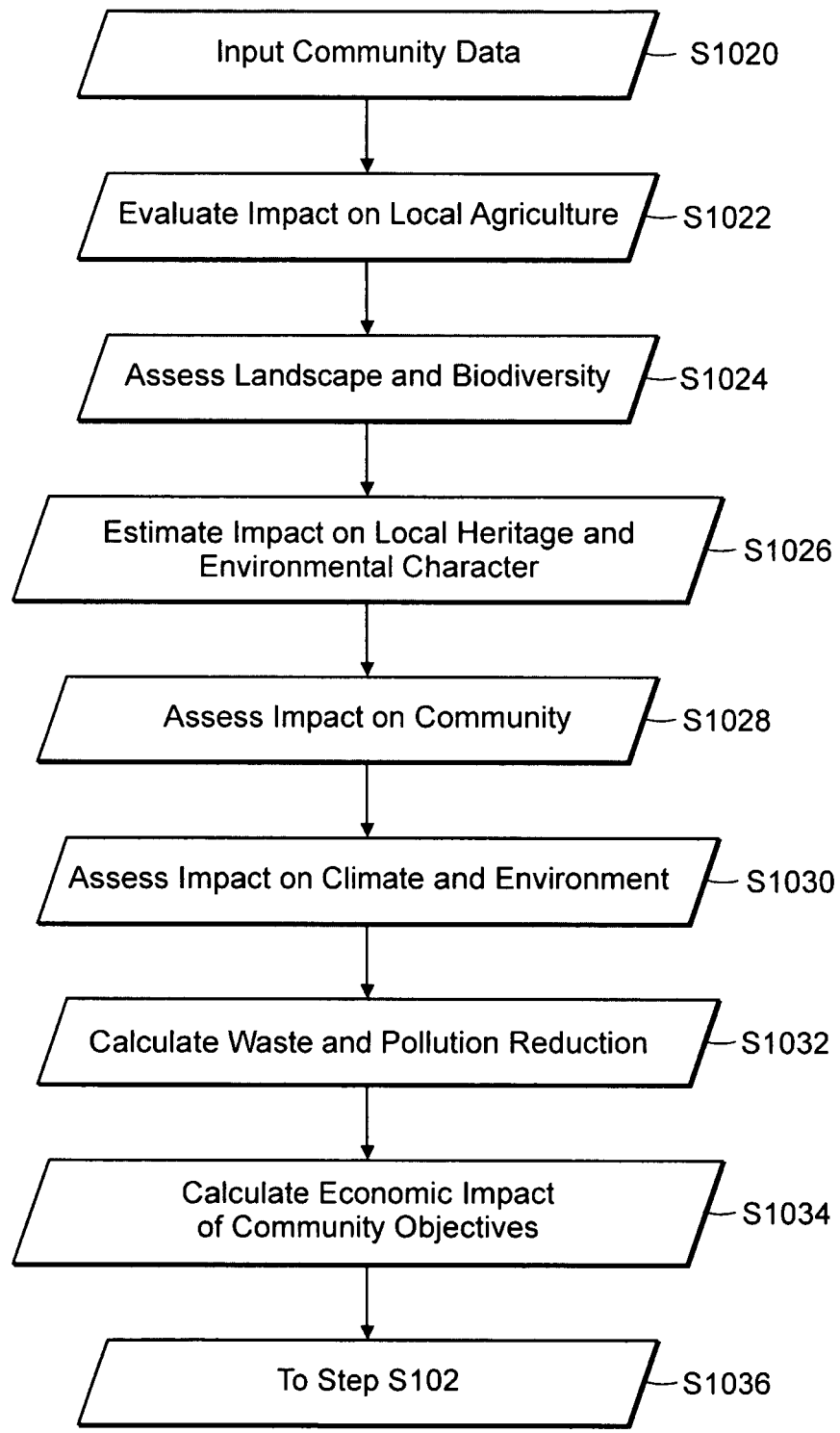
FIG. 5 is a flow chart illustrating a method for computing the economic risks and benefits associated with the municipal solid waste management system established in accordance with the present invention.

As noted above, the community receives numerous economic and environmental benefits through the system 10, including both tangible services and facilities as well as savings from improved recycling, energy conservation and public health. As shown in step S102, the method requires that the community determine an economic impact, or value, of its objectives. This valuation process is described in detail in FIG. 5, a flowchart that depicts the process by which the community values its objectives.

In step S1020, the community data is inputted into the method of the present invention. The community data includes the size and demographics of the community, the types source inputs 12 produced, the location of any sensitive environmental or historical sites and the like. In step S1022, the method recites evaluating the impact of the system 10 on the local agriculture. Landfill elements 14 produce a number of byproducts, some of which may impact the soil, water quality and overall health of the agricultural system. A municipal waste system operated according to the present invention however should minimize or eliminate any harmful byproducts of waste disposal following the zero-emissions model described in detail below. In step S1024, the method recites assessing the landscape and biodiversity of the community in order to properly optimize the location and functionality of the landfill elements 14. Again, in a zero-emissions preferred embodiment, the system 10 of the present invention becomes an asset as opposed to a liability, and therefore it is anticipated that the installation and operation of the system 10 in a community may increase the landscape and environmental health of the community.

In step S1026, the method calls for estimating the impact of the system 10 on the local heritage and environmental character of the community, i.e. whether the system 10 will cause or accelerate any degradation of the environment or landmarks or whether the system will preserve or increase the environmental health of the community. Optimal operation of the system 10 of the present invention according to the methods described herein should result in minimal environmental damage. Moreover, following the zero-emissions embodiment described below, the system 10 of the present invention can actually contribute significantly to the environmental health of a community while simultaneously proving to be an economic asset for that same community.

In step S1028, the method recites assessing the impact of the system 10 on the community, including at least any increase in employment and increase in standard of living within the population. In step S1030, the method calls for assessing the impact of the system 10 on the climate and environment, which includes projections as to any benefits that may be derived from implementation of the system 10. As noted above, proper implementation of the methods of the present invention will cause an increase in environmental health by minimizing or eliminating landfill emissions while increasing the size and efficiency of the landfill itself. Other economic and environmental benefits of the system are projected in step S1032, in which the method recites calculating the reduction in waste and pollution affected by introduction of the system 10 of the present invention, which according to the zero-emissions embodiment would result in a substantial or total elimination of landfill emissions.

In step S1034, the method requires calculating the economic impact of the community objectives, i.e. whether implementation of the system 10 to meet the community objectives results in a net positive or net negative economic effect. This is preferably accomplished by weighing each of the separate values derived in the preceding steps together and determining a net effect. As one purpose of the present invention is to create and operate a system 10 that is an asset as opposed to a liability, it is the case that the net economic value of the system 10 to the community will be positive.

Implementation of the system may result in job creation, which in turn may result in higher population, which inevitably will lead to more waste products which in turn will lead to more energy production and recycling. Accordingly, in weighing the separate values in accordance with step S1034, the community is providing a cost-benefit analysis of the system 10. This analysis results in a final estimated economic effect that can be inputted directly into the method of the present invention via step S1036, which provides that the results of step S1034 are inputted into step S102. In summary, the method of the present invention factors in the estimated costs and benefits to be had by the community should it choose to establish the system 10 of the present invention.

Figure 6:
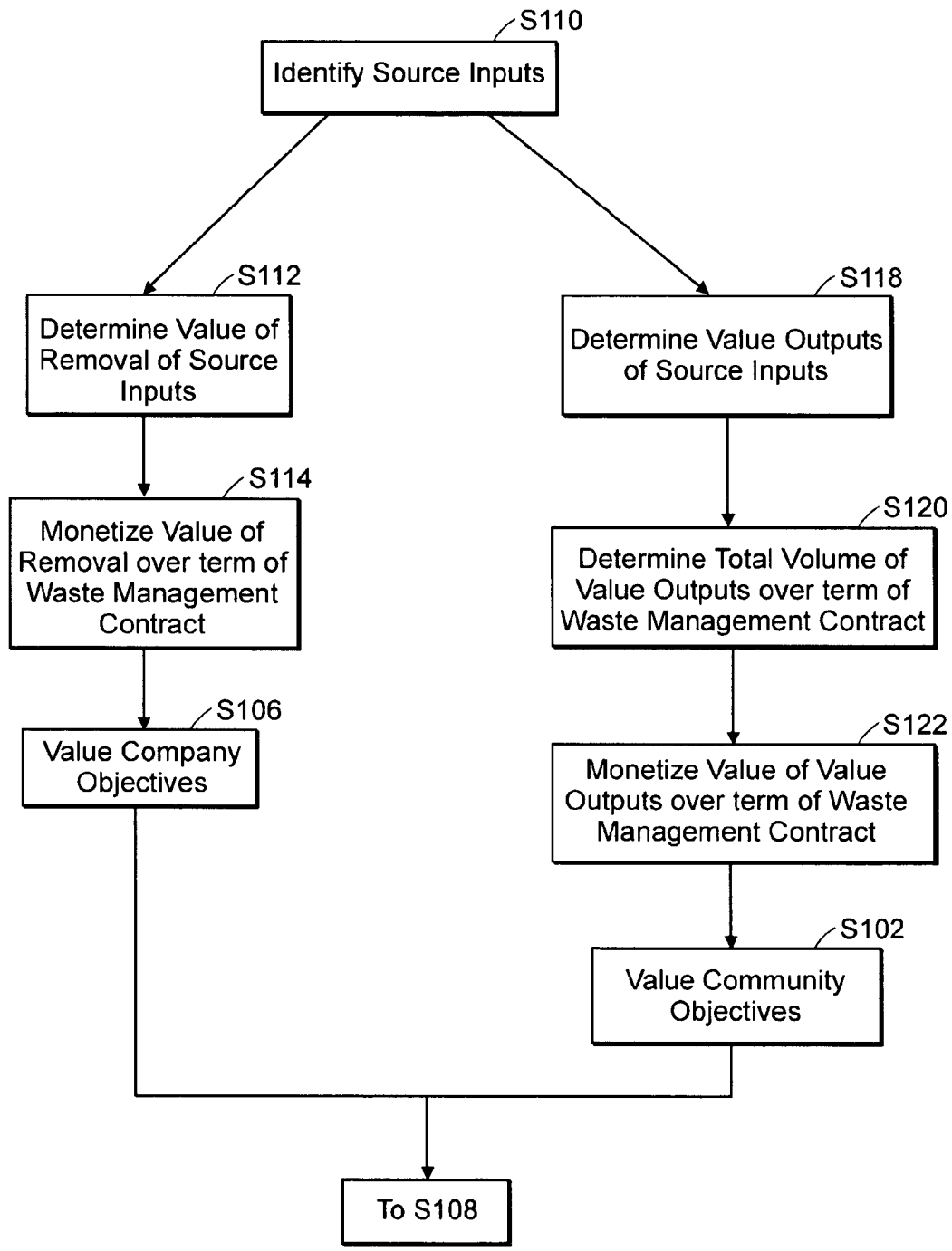
FIG. 6 is a flow chart illustrating a method for determining the relative values of services and assets provided by parties according to the method of the present invention.

The valuation process if further illustrated in FIG. 6, which is a flow chart illustrating a method for determining the relative values of services and assets provided by parties according to the method of the present invention. In step S110, the source inputs 12 of the system 10 are identified. The identification of the source inputs 12 invariably determines to some extent the types of value outputs 16 that can be generated by the landfill elements 14.

As shown in FIG. 6, once the source inputs have been identified, the value of their removal is determined in step S112. This value is essentially the value of the waste management contract to the company, described above with reference to FIG. 4. The output of step S112 is then monetized over the term of the waste management contract in step S114, i.e. the total value is spread out over the life of the contract and discounted to its present value. This monetized value is then fed forward into step S106, described with reference to FIG. 4, and thereafter fed forward into step S108 in which the community-company venture is established.

Once the source outputs 12 are identified in step S110, the potential byproducts or value outputs 16 are determined in step S118. As previously noted, the value outputs 16 include for example the recycled products and energy generated by the landfill elements 14. In step S120, the total volume of the value outputs 16 over the life of the waste management contract is determined, which corresponds to the total expected energy production and savings generated through recycling and reuse of source inputs 12. In step S122, the value of the value outputs 16 is monetized over the term of the waste management contract and discounted to its present value.

For example, the landfill elements 14 may be expected to produce 100 Megawatts of energy per year for 15 years, which corresponds to a gross value of 1.5 Gigawatts of energy over the life of the contract. This total energy production is valued and discounted such that the community can readily identify its current savings in energy production over the life of the contract. Step S122 feeds into step S102, in which the value of the value outputs 16 is combined with the cash value of the waste management contract to determine the gross value of the community objectives. As noted above, the value of the community objectives is fed forward into step S108, in which the community-company venture is established according to the present invention.

Figure 7:
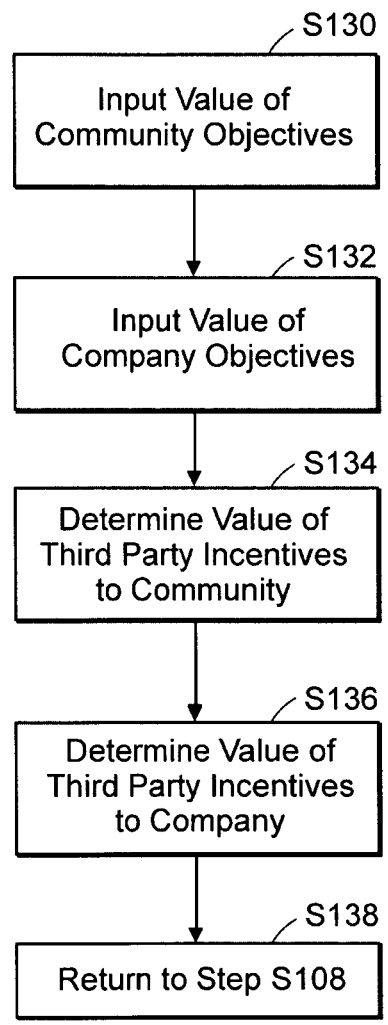
FIG. 7 is a flow chart illustrating a method for computing the economic values of the objectives of the parties according to the method of the present invention.

The economics of the community-company venture may also be affected through third-party incentives. For example, there may be tax credits relating to landfill operation available at the local, state and federal levels, all of which operate to effectively increase the profitability of the enterprise to the company. Similarly, there may be preservation, conservation or remediation funds available from local, state or federal environmental agencies that the community can receive through the system 10 of the present invention. A method for valuing these potential incentives is presented in FIG. 7.

In step S130, the method requires inputting the value of the community objectives as determined according to the processes described above. Similarly, step S132 requires inputting the value of the company objectives, preferably as expected over the term of the contract according to the tax or accounting year of the company. In step S134, value of any third party incentives to the community are valued over the life of the contract. For example, if there is a conservation grant available to the community for its establishment of a municipal recycling facility according to the present invention, then the value of this grant should be monetized as discounted over the life of the contract. In step S136, the value of any third party incentives to the company is determined, including any tax rebates or incentives that may be available for the production or distribution of energy through the landfill elements 14. These incentives would be assigned to the company according to proper accounting methods, and discounted to their present values over the life of the contract. Once the values of any third party incentives are properly valued, step S138 returns to step S108 in order to establish the community-company venture.

Figure 8:
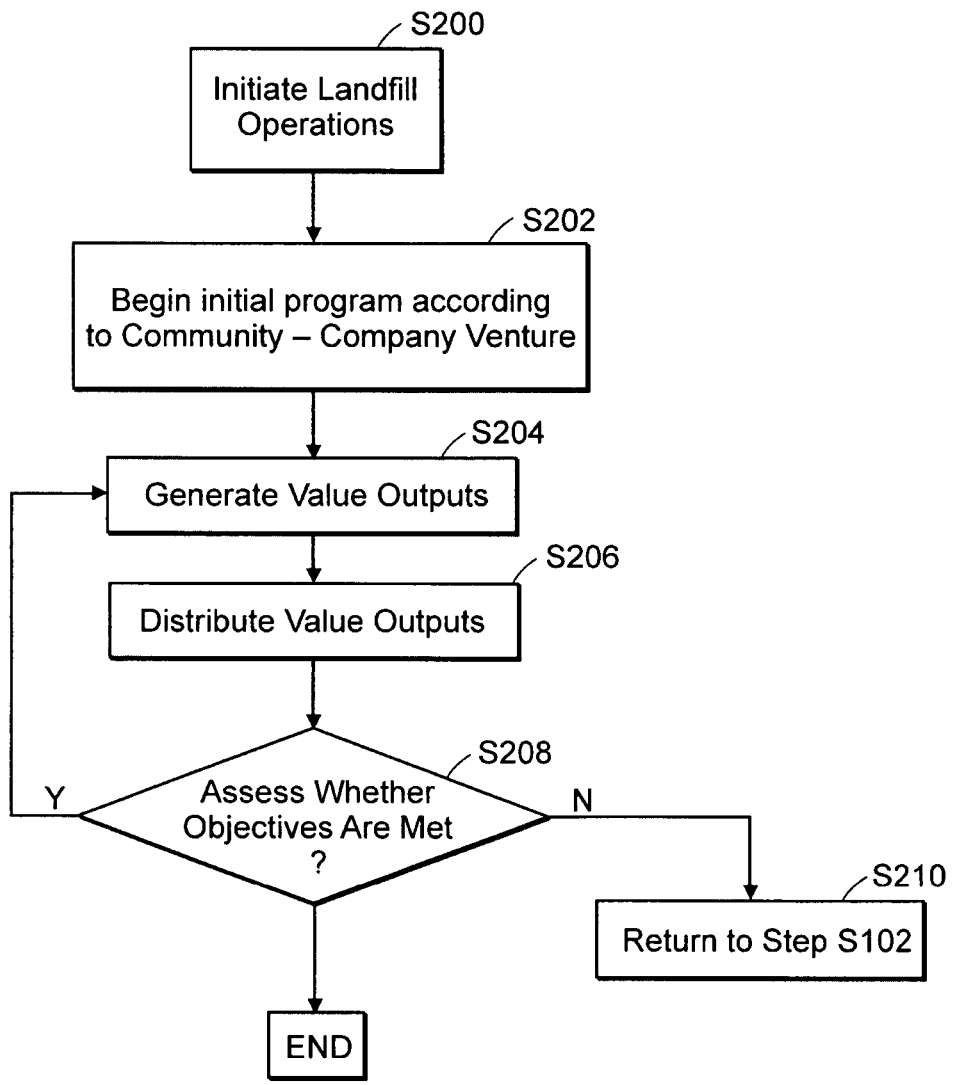
FIG. 8 is a flow chart illustrating a method for operating a municipal solid waste management system established in accordance with the present invention.

The initial conditions for the community-company venture are established as described above. Thereafter, the present invention also includes a method for monitoring and optimizing the status and parameters of the venture. A method for operating municipal solid waste management system established in accordance with the present invention is shown in FIG. 8. In step S200, the landfill operations are initiated. Namely, the landfill elements 14 are brought on-line, source inputs 12 are provided and the value outputs 16 are generated according to the waste management contract. In step S202, the initial program begins according to the venture established according to the present invention, thereby generating value outputs in step S204. In step S206, the method of operation recites that the value outputs 16 are distributed to the community. For example, in step S206 any electrical energy generated is used for operation of the landfill elements 14 or distributed to the community at large. Similarly, any recycled or created products are distributed to processors for recirculation into the commercial chain as new glass or electronic equipment.

Step S208 is an assessment as to whether the objectives of both the community and the company are being met, i.e. whether the value outputs 16 correspond to the community's economic plan and are the source inputs 12 sufficient in volume for the company to remain profitable. If the objectives of both parties are met, then the venture continues as-is in the generation and distribution of value outputs 16 according to steps S204 and S206. If the objectives of the parties are not being met, then the method feeds back to step S102, at which time the community will re-identify or re-state its objectives and the method for establishing the venture will begin anew. In short, the method of operating the municipal solid waste management system measures the performance of the venture against the expectations of the parties and provides remedial action when necessary.

As previously noted, the method of the present invention is preferably embodied in a software or other suitable algorithm that can identify the economic terms of the venture and make the necessary computations in order to ensure the venture continues to operate as intended. In its most preferred embodiments, the source inputs 12 and the value outputs 16 are themselves monetary values that can be entered into a program for optimizing the configuration of the landfill elements. For example, the source inputs 12 can be measured in terms of volume and revenue to the company, while the value outputs 16 can be measured in terms of energy savings, capital formation (in the case of newly constructed landfill elements 14), and revenue from recycled and reused products of the system 10.

Figure 9:
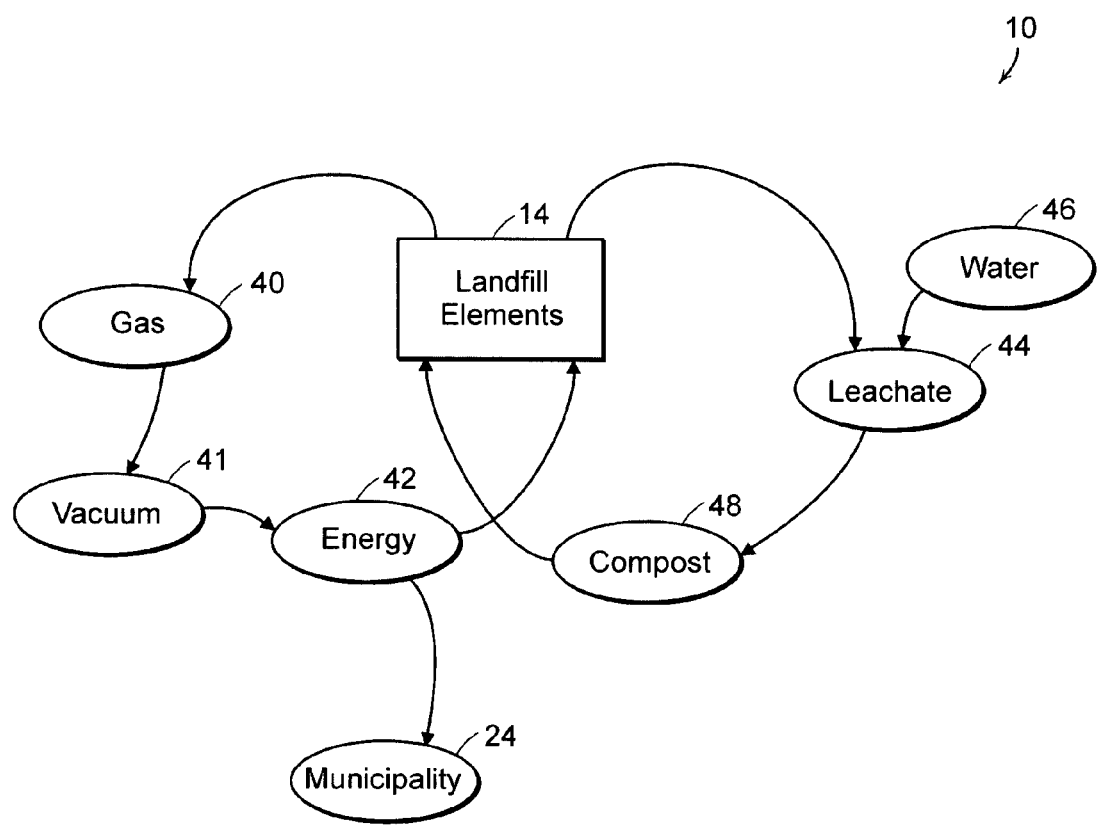
FIG. 9 is a state diagram of a municipal solid waste management system in a zero-emissions configuration in accordance with the present invention.

FIG. 9 is a state diagram of the system 10 of the present invention according to its preferred embodiment as a zero-emissions asset operating on behalf of a community. The system 10 is primarily composed of landfill elements 14, which have been described above in great detail. As previously noted, the landfill elements 14 of the system 10 are selected and operated according to the methods described above, with a primary focus on maximizing the economic and environmental gains to the municipality 24, the waste management company 24 and the venture stakeholders 20.

The landfill elements 14, in their normal course of operation, will produce a number of byproducts, the most important of which are gas 40 and leachate 44. The gas 40 is typically methane, which is combustible and noxious; and the leachate 44 may have toxic or otherwise unfriendly chemicals or compounds therein. While the prior art has attempted to deal with these byproducts through dilution, the system 10 of the present invention is configured to harness these would-be liabilities and convert them into assets for the benefit of the municipality 24.

In particular, the gas 40 that builds up inside the landfill can be extracted and used for combustion and heating given the proper equipment. For example, a vacuum 41 can remove the gas 40 from beneath the surface and direct along piping to storage and combustion means where the gas 40 can be safely converted to energy 42. To ensure complete removal of the gas 40 from the landfill elements 14, it is preferred to utilize a vacuum 41 having a very large diameter. More particularly, a seventy-inch vacuum provides the necessary pressure drop to ensure complete removal of the gas 40 from the landfill itself. As the gas 40 is removed by the vacuum 41, the overall volume of the waste within the landfill is decreased, thus allowing for even more usage of the system 10.

The natural flow of water 46 through the landfill mass produces leachate 44, which has typically been treated as a substance to be contained using advanced landfill liners and the like. However, the present invention utilizes the leachate 44 to accelerate the decomposition of a compost 48 mass. Thus the leachate 44, produced by natural or artificial means including the addition of water 46, is used by the system 10 to increase the rate at which the compost 48 decomposes. The decomposition of the landfill mass will in turn produce a greater volume of gas 40, which can be extracted as described above. Specially designed landfill liners, known in the art, fitted with channeling means are preferred for directing the leachate flow from the surface into the more dense segments of the landfill mass in order to decompose the waste. More preferably, the landfill elements 14 include means for recirculating the leachate throught the landfill mass to ensure consistent and accelerated decomposition. As the landfill mass decomposes, its volume decreases thereby permitting still more usage from the original site.

The gas 40 that comes about through composting, as accelerated through the targeted use of leachate 44, can be converted into energy 42 in the form of heat or electricity. The energy 42 can be distributed to the municipality 24 at large through a power grid, or alternatively at least a portion of the energy 42 can be returned to the landfill elements 14 to improve the performance and efficiency of the system 10. Various industries that utilize gas 40 extracted from landfills will directly obtain the gas 40 out of the system 10 and consume it for their own purposes, such as heating for example. As before, the extraction of the gas 40 and the usage of the leachate 44 both decrease the volume of the landfill mass, which in turn permits the system 10 to accept still more source inputs 12 through the method described above.

The complete integration and use of the byproducts of the landfill mass, primarily the gas 40 and the leachate 44, allow the system 10 of the present invention to operate at or near zero-emissions. By recirculating the leachate 44 through the landfill mass, the system creates a steady volume of gas 40 that can be extracted and used for renewable energy. Thus by utilizing each and every resource available within the system 10, the byproducts of waste management are consumed for the production of new and usable assets, e.g. energy. The zero-emissions operations of the system 10 also vastly increase the environmental health of the community, while providing numerous other economic and environmental benefits including the production of reusable energy.

The present invention has been particularly described herein with reference to specific preferred embodiments of a municipal solid waste management system and a method of creating that system. Each element described above should be understood to incorporate those steps and or apparatuses that perform equivalent functions. As such, it should be understood that those skilled in the art could readily devise adaptations and modifications of the present invention that nevertheless fall within the scope of the present invention as defined in the following claims.

We claim:

1. A municipal solid waste management system comprising:
   a plurality of landfill elements that are selected in response to at least one source input and adapted to generate at least one value output, the plurality of landfill elements located near a landfill mass, which includes municipal solid waste products, wherein the at least one value output includes community objectives;
   a plurality of landfill liners with a channel for directing the flow and volume of leachate to selected portions of the landfill mass such that the leachate is directed from the surface of the landfill mass to an interior segment of the landfill mass, wherein the leachate has been produced naturally or artificially;
   a combination of recirculation system and at least one of natural or artificial means for increasing the rate of decomposition of the landfill mass producing a greater volume of gaseous byproducts;
   gas removal means for removing the gaseous byproducts of the landfill mass;
   an energy conversion system for converting the gas removed by the gas removal means into reusable energy, wherein the at least one source input is added in accordance with a decrease of the overall volume of the landfill mass by at least one of the gas removal system and the leachate; and an energy distribution system for storing and distributing the reusable energy to the landfill elements.

2. The system of claim 1 wherein the energy distribution means further includes means for distributing the reusable energy to the municipality.

3. The system of claim 1 wherein the gas removal means includes means for at least a vacuum for removing the gas from the landfill mass.

4. The system of claim 1 wherein the gas removed by the gas removal means is methane gas.

5. The system of claim 1 wherein the at least one source input includes at least one of municipal solid waste, construction and demolition waste, green waste, electronic waste, liquid waste and recyclables.

6. The system of claim 1 wherein the at least one value output includes at least one of electricity and gas, thermal energy, recyclable pump, created products and reusable products.

7. The system of claim 1 wherein the landfill elements include a municipal recycling facility, a renewable energy facility, a composting facility, a glass beneficiating facility, an electronics recycling facility, a wood cleaning facility, a recycling education center and a research facility.

8. The system of claim 1 wherein the gas removal means and the energy conversion means cooperate so as to provide zero-emissions production of energy.

9. The system of claim 1 wherein water is added to the leachate to further increase the decomposition rate of the landfill mass.

10. The system of claim 1 wherein the recirculation system produces consistent and accelerated decomposition of the landfill mass.

11. The system of claim 1 wherein the recirculation system recirculates leachate throughout the landfill mass.

12. The system of claim 1 wherein the recirculation system creates a steady volume of gas from the landfill mass.

13. The system of claim 1, wherein the municipal solid waste system reduces emissions produced by the plurality of landfill elements and the predetermined class of source inputs.

14. The system of claim 1, wherein the energy conversion system comprises storage and combustion means for directing the gaseous byproducts removed by the gas removal means.

15. The system of claim 1, further comprising means for reducing emissions produced by the at least one source input and the plurality of landfill elements.

16. The system of claim 1, wherein the interior segment is a denser segment of the landfill mass.

17. The system of claim 2, wherein a portion of the reusable energy is returned to the landfill elements after at least a portion is distributed to the municipality.

* * * * *